Figure 3:
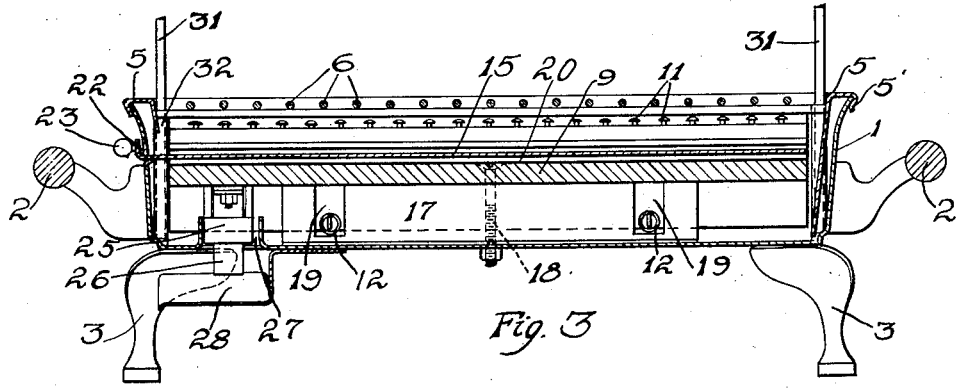

C. P. MADSEN.
ELECTRICAL HEATER.
APPLICATION FILED JULY 9, 1910.
1,014,161.
Patented Jan. 9, 1912.
3 SHEETS—SHEET 1.
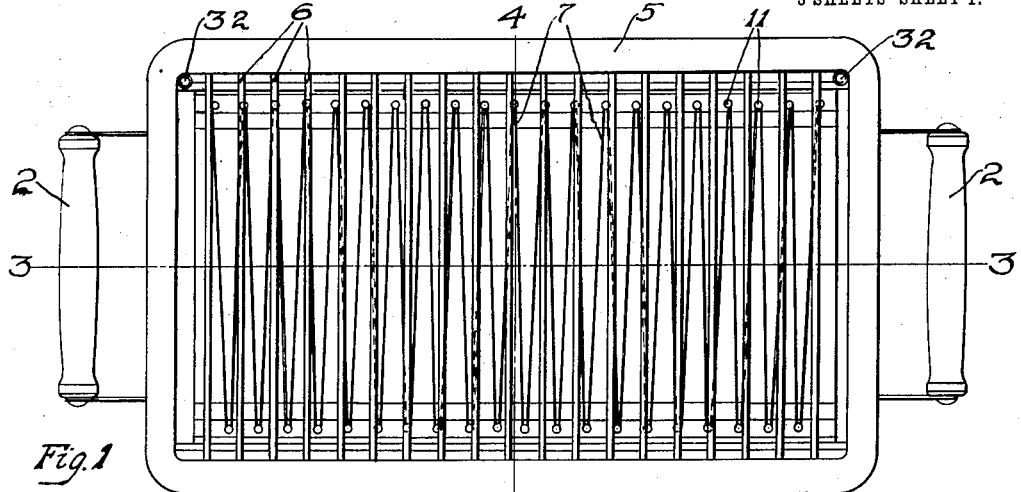
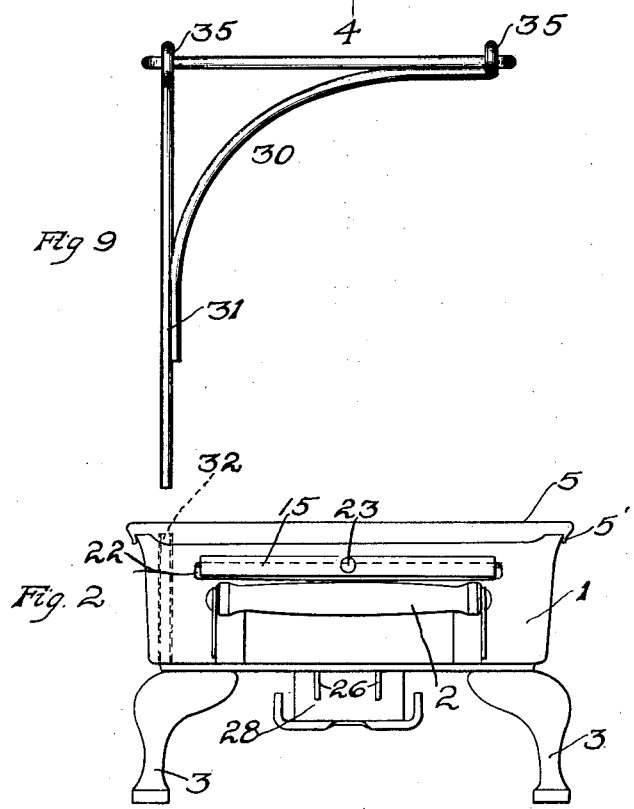
Witnesses
Robert S. McCreadie
E. F. Wilson
Inventor
Charles P. Madsen
by [signature]
Atty.

C. P. MADSEN.
ELECTRICAL HEATER.
APPLICATION FILED JULY 9, 1910.

1,014,161.

Patented Jan. 9, 1912.

3 SHEETS—SHEET 2.

Witnesses
Robert S. McCreadie
E. R. Wilson

Inventor
Charles P. Madsen
by
Atty.

C. P. MADSEN.
ELECTRICAL HEATER.
APPLICATION FILED JULY 9, 1910.

1,014,161.

Patented Jan. 9, 1912.

3 SHEETS—SHEET 3.

Witnesses
Robert S. McCreadie
E. F. Wilson

Inventor
Charles P. Madsen
by
Atty.

UNITED STATES PATENT OFFICE.

CHARLES P. MADSEN, OF CHICAGO, ILLINOIS, ASSIGNOR TO PELOUZE ELECTRIC HEATER CO., OF CHICAGO, ILLINOIS, A CORPORATION OF ILLINOIS.

ELECTRICAL HEATER.

1,014,161.  Specification of Letters Patent.  Patented Jan. 9, 1912.

Application filed July 9, 1910. Serial No. 571,234.

*To all whom it may concern:*

Be it known that I, CHARLES P. MADSEN, a citizen of the United States, and resident of Chicago, Cook county, Illinois, have invented certain new and useful Improvements in Electrical Heaters, of which the following is a full, true, clear, and exact description, such as will enable others skilled in the art to which it appertains to make and use the same.

My invention relates to improvements in the art of electric heating devices and particularly to electric heaters of the type used for toasting bread, cooking various food products and the like and for air warmers and heating stoves.

My invention has for its object the provision of an electric heater of the above class in which the heating element or heat generator will be maintained out of mechanical contact with its support or the rest of the structure and will be surrounded by a body of air, which will radiantly impart the heat to the external object to be heated through the medium of the atmosphere surrounding the heating element, and in which substantially all of the heat will be confined or concentrated within an area where it will be wholly effective in heating the external object, thereby increasing the efficiency and heating capacity of the heater and the speed at which the object is heated for a given consumption of current.

A further object of my invention is to provide an electric heater which will be portable and neat of appearance and which will have its heating element of cheap construction independently removable as a unit from its containing receptacle so that should it become burned out or otherwise damaged it may be conveniently removed and another heating element substituted at comparatively little cost.

A particular object of my invention is to improve and simplify the unit heating element constituting a part of the invention which forms the subject matter of my co-pending application, Serial No. 571,235, filed July 9, 1910; to improve the means for supporting the heating conductor and for automatically maintaining said conductor constantly in its proper relative position irrespective of its changes in dimensions due to contraction and expansion thereof.

A further object contemplates the provision of an electric heater having means associated therewith for holding food, once cooked thereby, in position to keep it warm for an extended length of time.

Figure 4:
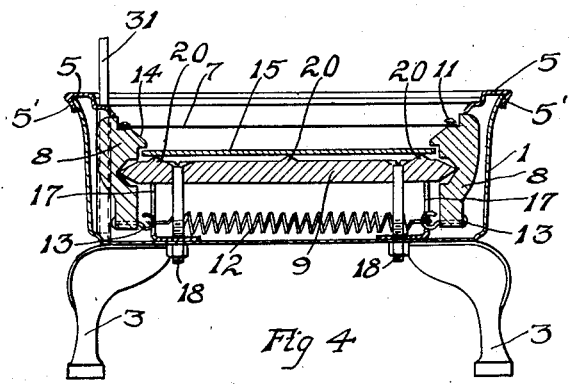
Figure 5:
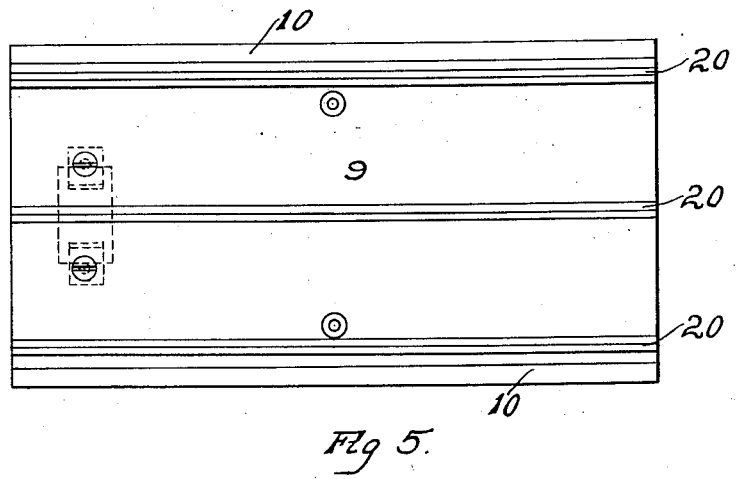
Figure 6:
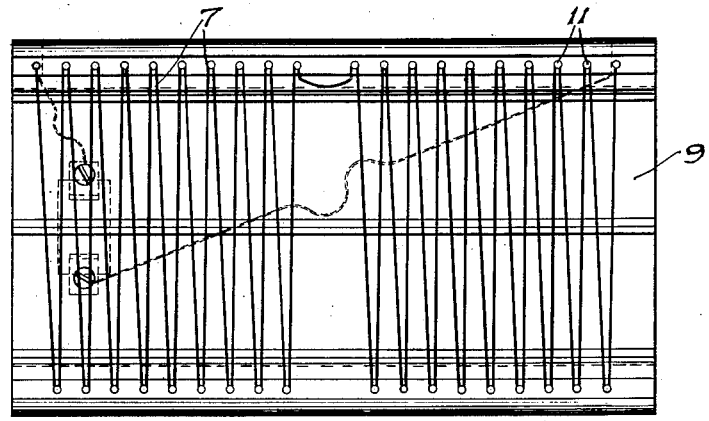
Figure 7:
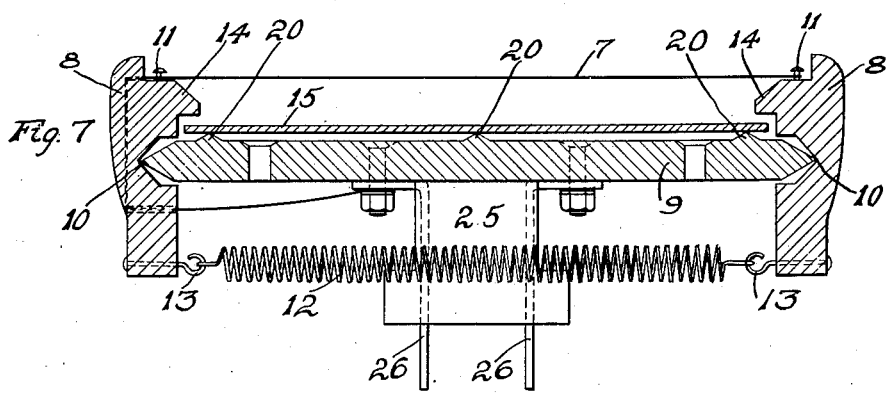
Figure 8:
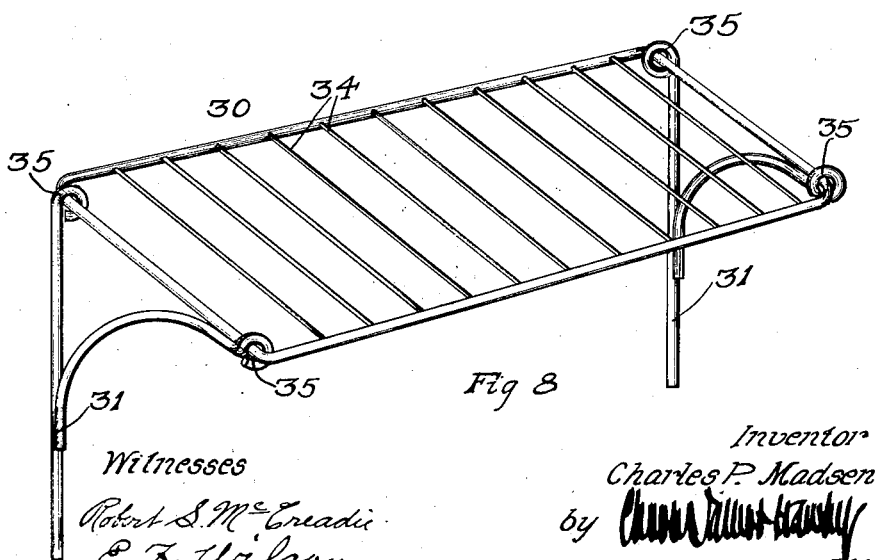

I will describe my invention further by reference to the accompanying drawings in which:

Figure 1 is a top plan view of an electric heater embodying my invention; Fig. 2 is a view thereof in end elevation; Fig. 3 is a longitudinal sectional view on line 3—3 of Fig. 1; Fig. 4 is a transverse sectional view on line 4—4 of Fig. 1; Fig. 5 is a bottom plan view of the unit heating element; Fig. 6 is a top plan view thereof; Fig. 7 is an enlarged sectional view of the unit heating element showing the relation of the various parts thereof; Fig. 8 is a perspective view of the warming shelf or grid; and Fig. 9 is a view in end elevation thereof.

Like parts will be characterized by similar reference numerals throughout the several views.

The structure which I have shown in the drawings is an electric heater particularly designed for toasting bread or for broiling meat and the like.

The heating element and the various parts are contained in a casing or receptacle 1 formed preferably of sheet metal and of suitable contour to present a neat appearance, handles 2 being provided by which it may be conveniently carried about, and legs 3 upon which it stands. The casing is open at its top. Bridging or spanning this opening is a grid or grating upon which the external object, such as bread, meats and the like are supported. This grid consists of an open-work frame having a rim 5 and having a number of bars or rods 6 disposed transversely at intervals between the sides of the rim. The bars preferably lie flush with the upper face of the rim so that the whole grid presents a substantially flat upper face. The grid may be made in any other suitable manner, such as expanded metal, so that it provides an open-work frame sufficient to hold the food and still permit the heat from the heating element to reach the food directly. It is supported by the upper edge casing or receptacle 1 and held in place thereon by means of yielding, downwardly projecting flanges 5' which are arranged to be sprung over the flared upper edge of said casing. This provides a convenient means by which the grid can be removed to disassemble the structure.

The heating element is arranged at a given distance below and parallel to the food grid and is independently supported within the casing 1 so as to be removable as a unit therefrom. I have found by extensive experiment that, in an electric heater of this class, if a heating element of a given temperature is arranged so as to impart or radiate its heat to the external object through the atmosphere and is spaced therefrom a given distance the highest efficiency and greatest heating capacity is obtained for a given current consumption. Now in order that the heating element may be spaced from the external object a given distance which is uniform through the heated area it is essential that it be arranged in one plane parallel with said object. I have accordingly preferred to employ a suitable electric conductor 7 wound reflexively or zigzag to lie in one plane and supported at the bends therein out of mechanical contact with any object so as to be surrounded and inclosed by the atmosphere. It will be understood, of course, that the conductor may be wound in any desired manner to form a plane geometric figure best adaptable to the structure in which it is to be used. The wire or conductor is by preference round, although wire or rods of any shape of cross section may be used.

The changes in temperature due to the shutting on or off of the current or to accidental drafts of cooler air cause the conductor to contract and expand and accordingly tend to displace the several portions thereof out of their given plane. This, however, is compensated for or taken up automatically by one or more movable side members, tension bars or rockers 8. Each tension bar comprises a substantially flat bar of insulating material disposed on the long side or edge of the refractory insulating base member or plate 9 and preferably mounted on a knife edge bearing 10 on said edge of said base member 9. Substantially half of each bar lies above and half below the base plate 9 and on their upper edges they carry rows of pins 11 upon which are looped the reflex portions of the heating conductor 7. Each of these side bars is preferably common to one side of the reflex heating conductor 7 although it is manifest that it may be made in several divisions each division being common to one or more reflex portions of said conductor. Between the lower edges of the bars 8 are several spiral springs or tension members 12 anchored at their ends by means of hooks 13 on the lower edges of said bars. These springs permit the bars to swing on their bearings 10 but they exert a constant tension thereon to automatically maintain the heating conductor 7 taut and in its given plane irrespective of the contraction and expansion thereof. It will be seen that the temper of the springs is not in the least impaired since they are disposed below the base member 9 and entirely outside of the influence of the heating conductor. The knife edge bearings 10 on the base member are set into respective bars a considerable way so that the edges overlap the beveled edges of the base member. This arrangement prevents crumbs and drippings from entering the bearings and yet the bars are separated from the base in such manner as to allow sufficient movement of the side bars.

The upper edges 14 of the side bars are beveled to diverge outwardly so as to increase to a certain extent the area heated by the heating conductor. The heating conductor 7 with its tension bars 8 and base member 9 comprise a structure independent of the casing and removable as a unit therefrom. This entire heating unit is separated from the casing by an air space and is in contact therewith only at the upper edges of the vertical strips or plates upon which the base member 9 rests and upon which it is clamped by bolts 18, these plates 17 being provided with openings 19 for the springs 12. The space between the casing and the heating element constitutes in a sense an air wall into which stray heat from the conductor 7 is dissipated and which in consequence keeps the casing practically at the temperature of the outer atmosphere.

The heating conductor is arranged in one plane and will naturally heat the atmosphere on both sides thereof. Since in electric heaters designed for use as bread toasters it is preferable and in fact more practicable to dispose the food on the upper side of the heating element, I have provided means by which the heat radiated from the lower side of the heating element is rendered effective to heat the food above said heating element. This means is embodied in the form of a heat reflector 15 disposed below the heating conductor 7. It comprises a rectangular plate of metal arranged parallel and at a given distance from said conductor. This plate reflects the downward radiation and directs it upwardly to the side of the heating element upon which the external object is disposed. It is thus evident that the heat radiated downwardly from the heating conductor is cumulatively added to that radiated from the upper side; that is, substantially all of the heat radiated from the heating conductor is effective to heat the area on the upper side of said conductor, while practically none is dissipated into the casing or the atmosphere and hence wasted so far as the object to be heated is concerned.

The reflector is rested upon ribs 20 carried on the upper face of the base member 9 which space it therefrom and prevent it from sagging into electrical contact with the heads of the bolts 18 should it by any chance be heated unduly. The reflector has one of its ends extending through an opening 22 in the casing and is upturned to cover up said opening. The upturned end has a knob 23 by which the reflector may be conveniently removed or replaced, the reflector being intended to serve the additional function of removable crumb or dripping tray.

Depending from the underside of the base plate near one end thereof is a block of insulating material 25 carrying terminal plates 26 suitably connected to the conductor 7 to form terminals therefor. These terminal plates extend through an opening 27 in the casing into a connecting plug socket 28 disposed adjacent said opening 27. These terminals serve as a means by which the heater may be connected to a source of electric current.

The electric heater of my invention has associated with it means for keeping the food in a warmed condition. This comprises an open-work shelf 30, the side bracket or members 31 of which have lower ends removably inserted in sockets 32 disposed vertically in the corners of the casing 1. This shelf is preferably formed rectangularly of a heavy, round wire or rod having transverse bars 34 arranged at intervals. The brackets 31 are hinged to the ends thereof at points 35 so that it may be removed when it is not used and may be folded up and put away.

My novel heater as herein shown and described is capable of considerable modification without departing from the spirit of my invention. For example, it is obvious that windings of the conductor may be permanently secured at one side of the insulating base and held in tension by a single movable element or tension bar at the other side of the base. It will also be understood that the heating element may be arranged either singly or in pairs and supported in inclined or vertical positions and the means for supporting and protecting the heating element may be modified according to the uses to which the device is to be put. Still other modifications may be made and employed within the scope of my invention, and for the reasons here stated I desire it to be understood that my invention is not limited or confined to the specific structure herein shown and described.

I claim:

1. In an electrical heating device a heating element consisting of an electrical conductor wound in a plane of suitable geometric form, a tension bar on each side of said heating element common to the several portions of said conductor and tension members connecting said bars for maintaining said heating element in its given plane regardless of the contraction and expansion of said conductor due to changes in temperature thereof, a food grid holding the food out of contact with and parallel to said conductor, a heat reflector disposed below said heating element in parallel relation thereto and at a given distance therefrom, said reflector coöperating with said heating element to render the heat developed by said heating element effective on the food side of said heating element.

2. In an electrical heating device a suitable casing open at its top, and a heating element disposed within said casing and separated therefrom by an air space, said heating element being removable as a unit from said casing and comprising a plate of refractory insulating material, an electrical conductor supported thereby out of contact therewith and wound in one plane, and tension bars movable relatively to said plate and common to the several portions of said heating element and tension members below said insulating plate acting to maintain said heating element in its given plane, irrespective of the contraction and expansion thereof.

3. In an electrical heating device a suitable casing open at its top, and a heating element disposed within said casing and separated therefrom by an air space, said heating element being removable as a unit from said casing and comprising a base of refractory insulating material, an electrical conductor supported thereby above said base and wound in one plane and oppositely acting tension bars movable relatively to said plate and common to the several portions of said heating element for maintaining said heating element in its given plane irrespective of the contraction and expansion thereof, a removable heat reflector carried by said insulating base below said heating element, and a food grid removably supported by said casing above said heating element, said heating element and heat reflector coöperating to render effective above said heating element the heat radiated therefrom below said heating element.

4. In an electrical heating device the combination with a suitable casing open at its top, a refractory insulating plate disposed within said casing and separated therefrom by an air space, tension bars on each side of said plate movable relatively thereto, a reflexively wound electrical heating conductor disposed above said plate and supported in one plane by said bars and having contact terminals secured to said plate, and tension members connecting said bars below said plate for compensating for the contraction and expansion of said heating conductor to maintain it constantly and automatically in its given plane.

5. In an electrical heating device the combination with a suitable casing open at its top, a refractory insulating plate disposed within said casing and separated therefrom by an air space, tension bars on each side of said plate, movable relatively thereto and having attachments for the heating conductor, a reflexively wound electrical heating conductor disposed above said plate and supported by said attachments on said bars to lie in one plane, and tension members connecting said bars below said plate for compensating for the contraction and expansion of said heating conductor to maintain it constantly and automatically in its given plane, a heat reflector disposed parallel to and at one side of said heating conductor, and a food-holding grid removably supported by said casing in parallel relation and on the opposite side of said heating conductor.

6. In an electrical heating device the combination with a suitable casing open at its top, a refractory insulating plate disposed within said casing and separated therefrom by an air space, tension bars on each side of said plate equipped with conductor attachments, a reflexively wound electrical heating conductor stretched between the attachments on opposite tension bars, and tension members connected with at least one of said bars below said plate and through the medium thereof compensating for the contraction and expansion of said heating conductor to maintain it constantly and automatically in one plane, a heat reflector disposed parallel to and at one side of said heating conductor, and a food-holding grid removably supported by said casing in parallel relation and on the opposite side of said heating conductor, said heat reflector being adapted to reflect the downward radiation of heat and render it effective above said heating element.

7. In an electrical heating device the combination with a suitable casing open at its top, a refractory insulating plate disposed within said casing and separated therefrom by an air space, side bars on each side of said plate movable relatively thereto, a reflexively wound electrical heating conductor disposed above said plate, and supported by said bars, and tension members connecting said bars below said plate for compensating for the contraction and expansion of said heating conductor to maintain it constantly and automatically in one plane, said parts constituting a heating element independent of said casing and removable therefrom as a unit.

8. In an electrical heating device a suitable casing open at its top, a food-grid removably supported by said casing and spanning the open top thereof, in combination with a heating element supported within said casing, said heating element comprising an insulating base plate and an electrical conductor reflexively wound in one plane adjacent one side of said plate, a rocker-bar common to several portions thereof and a spring member adjacent the other side of said plate for maintaining said heating element in its given plane irrespective of the sagging of the several portions thereof due to the expansion of said conductor upon an increase of temperature.

9. In an electrical heating device a suitable casing open at its top, a food-grid removably supported by said casing and spanning the open top thereof, in combination with a unitary removable heating element supported within said casing, said heating element comprising an insulating base plate and an electrical conductor reflexively wound in one plane and disposed on one side of said base, a rocker-bar common to several portions thereof, and a tension member connected thereto and disposed on the opposite side of said base for maintaining said heating element in its given plane irrespective of the sagging of the several portions thereof due to the expansion of said conductor upon an increase of temperature.

10. In an electric heater the combination with a receptacle, a heating element disposed within said receptacle and separated therefrom by a body of air, said heating element comprising a base member of refractory material, a heating conductor arranged in one plane, a movable member common to the several associated therewith and portions of said heating conductor, and a tension member below said base member remote from the influence of said conductor and acting to compensate for the contraction and expansion thereof for maintaining said conductor in its given plane.

11. In an electric heater the combination with a containing receptacle, of a heating element disposed within said receptacle and independently removable therefrom, and surrounded by an air wall, said heating element comprising an insulating base member, a heating conductor arranged on one side of said base member and wound in one plane, and tension members on the opposite sides of said base member common to the several portions of said heating conductor and constantly exerting tension thereupon for maintaining said conductor in its given plane regardless of dimensional changes due to contraction and expansion.

12. In an electric heater the combination with a containing receptacle, of a heating element disposed within said receptacle and independently removable therefrom, and surrounded by an air wall, said heating element comprising an insulating base member, a heating conductor arranged on one side of said base member and wound in one plane, and tension members on the opposite side of said base member common to the several portions of said heating conductor and constantly exerting tension thereupon for maintaining said conductor in its given plane regardless of dimensional changes due to contraction and expansion, a removable heat reflector on said base member parallel to and at a given distance below said heating conductor, and means on the other side of said heating element opposite said reflector for supporting an object to be heated.

13. In an electrical heater a containing receptacle, in combination with a heating element disposed within and separated from said receptacle by an air wall, said heating element being removable from said receptacle as a unit and comprising an insulating base member, a heating conductor wound in one plane, means common to and supporting several portions of said heating conductor and a tension member below said base member constantly acting through the medium of said supporting means to automatically compensate for the contraction and expansion thereof.

14. An electric heater comprising a plate of refractory insulating material, in combination with a heating element consisting of a conductor wound in a single plane disposed above and parallel to said plate, a tension bar pivoted on said plate and connected to said heating element above said plate, and a tension member connected to and acting on said bar below said plate for maintaining the heating element in its given plane.

15. In an electric heater a flat plate of refractory insulating material, rocking members having bearings on opposite edges of said plate, a heating element disposed above and parallel with said plate and consisting of a conductor reflexively wound in a single plane between said rocking members, and a spring member acting on said rocking members below said plate for tensioning said heating conductor.

16. An electric heater comprising a plate of insulating material, oppositely acting tension levers fulcrumed on said plate, a heating conductor wound in a single plane adjacent to one face of said plate, but out of contact therewith, and a spring member connected to said tension levers adjacent the other face of said plate for tensioning said conductor.

17. An electric heater comprising a plate of refractory insulating material, a heating conductor reflexively wound in a single plane and disposed above and parallel to said plate, a rocking lever fulcrumed on said plate and connected to said conductor, said lever being equipped with attachments common to the bends in said conductor, and a tension spring positioned below said plate and acting through said lever to tension the conductor and maintain it in its given plane.

In testimony whereof, I have hereunto set my hand, this 29 day of June, 1910, in the presence of two subscribing witnesses.

CHARLES P. MADSEN.

Witnesses:
M. SIMON,
JOHN R. LEFEVRE.